P. G. BLOMBERG.
DRILL HOLDER OR CHUCK WITH SELF CENTERING DEVICE FOR BORING MACHINES.
APPLICATION FILED MAY 1, 1909.

984,998.

Patented Feb. 21, 1911.

Witnesses:
Hedwig Melinder

Inventor
Per Gotthard Blomberg

THE NORRIS PETERS CO., WASHINGTON, D. C.

UNITED STATES PATENT OFFICE.

PER GOTTHARD BLOMBERG, OF LILJEHOLMEN, STOCKHOLM, SWEDEN.

DRILL-HOLDER OR CHUCK WITH SELF-CENTERING DEVICE FOR BORING-MACHINES.

984,998.      Specification of Letters Patent.      Patented Feb. 21, 1911.

Application filed May 1, 1909. Serial No. 493,445.

*To all whom it may concern:*

Be it known that I, PER GOTTHARD BLOMBERG, a subject of Sweden, and resident of Liljeholmen, Stockholm, Sweden, have invented a new and Improved Drill-Holder or Chuck with Self-Centering Device for a Boring-Machine, of which the following is a specification.

My invention relates to improvements in the mode of centering the tool, which is obtained automatically by means of eccentric jaws, (generally three), each of which can turn to a certain extent around a pivot which is parallel to the vertical axis of the chuck, and the objects of my improvements are: first, to provide for the automatic fixation of drills of any diameter in the chuck; second, to provide for the simultaneous movement of the totality of the jaws when fixing a drill in the chuck; and, third, to maintain the jaws automatically closed on the drill while the boring-machine is working and to increase their pressure on the tool when the strain on the latter increases. I attain these objects by the mechanism illustrated in the accompanying drawing, in which—

Figure 1:
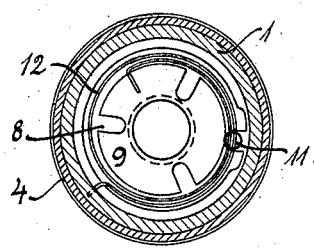
Figure 2:
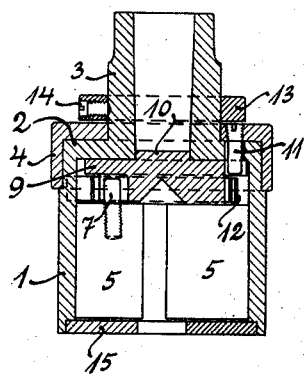
Figure 3:
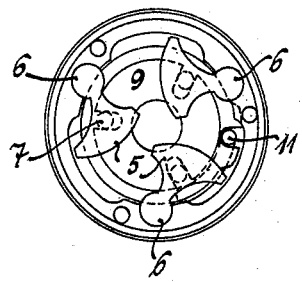

Figure 1 is a horizontal section of the chuck, after the removal of the jaws. Fig. 2 is a vertical section of the entire chuck. Fig. 3 is a top view after the removal of the cover of the chuck.

Similar numerals refer to similar parts throughout the several views.

The chuck given as example in the above mentioned drawing consists of the hollow cylindrical casing 1 with a bottom 2 and a circular socket 3. The inner-side of the casing is provided with three longitudinal grooves of circular section which are parallel to the vertical axis of the chuck; these grooves are open inward on a little less than half of the circumference of their section and serve as bearing for the pivots 6 of the three jaws 5. The number of the jaws, which is three in the accompanying drawing, can, of course, vary, for example 4, 5, if wanted. The cylindrical working surface of the jaw, *i. e.* the surface which grasps the drill, is eccentric in respect to the axis of rotation of the jaw, so that, by turning the jaw on one side or the other, the distance in straight line between its working surface and the axis of the drill becomes greater or shorter so that the jaws may grasp a tool of any diameter.

Each jaw is provided with a pin 7 which catches in one of the grooves 8 of the circular disk 9 which can rotate inside the casing 1. The disk 9 is provided with a short pivot 10 and can for example, be placed on the bottom 2 of the casing, the pivot 10 entering in the socket 3. By turning the disk 9 on one or the other side, the jaws rotate simultaneously in one direction or the other, the distance in straight line from the working surface of the jaws to the vertical axis of the chuck thus increasing or diminishing. It is evident that the grooves 8 could just as well be provided in the jaws 5 and the pins 7 fixed on the disk 9. A spring 12 whose one end is fastened to the disk 9 and other end to the casing 1 tends to turn the disk in such a way that, under the action of this spring, the jaws are kept closed on the drill or any object placed between them. Instead of using only the spring acting on the disk 9 one could also employ as many springs as there are jaws, each spring acting on one jaw.

By means of a ring or socket 4 the disk 9 can be turned in the opposite direction to the one above-said; the ring 4 is provided with a pin 11 which runs in a groove located in the side or the bottom of the casing 1 and catches in a hole or notch of the disk 9. By turning this ring 4 the jaws open, so that the tool can enter the chuck. As soon as the ring is left to itself the spring acts on the jaws which grasps the tool maintaining in this way the latter steady in the chuck.

The shape of the working surface of the jaws is such that, owing to the friction of the tool against them, the pressure on the latter increases when the strain becomes greater. The working surface of the jaws can be smooth, but should preferably be rough, in order to increase the adhesion of the drill against the jaws. In this case, the eccentricity of the surface can be chosen greater, so that the same chuck can be used for a greater quantity of drills of different diameters. A collar-ring 13 provided with a set-screw 14 or any other fixing device keeps the socket in its place. A cover 15 is placed on the opening of the casing 1 thus preventing the jaws from falling out of the chuck.

Several of the above described devices can be arranged otherwise as shown in the drawing, for example the jaws 5 can, instead of being provided with pivots which rotate in the grooves of the casing 1, turn on pivots which are located in the disk 9. In this case each jaw can be provided with a pin which catches in a slot located in the casing. An ordinary hinge could also be used, each jaw being then provided with a perforated nose at the top and the bottom, and the casing being provided with longitudinal holes of same diameter as the perforation of the noses of the jaws or vice-versa. A pivot passing simultaneously through the perforations of the jaws and the holes of the casing, allows the jaws to rotate but prevents them from falling out of the chuck. In this last case it is not necessary to use the cover 15.

The bottom 2 of the casing can be provided with slots through which the pins 7 can pass; in this case, the grooves in which they have to catch, instead of being provided in the disk 9 can be located directly in the ring 4 or vice-versa, i. e. the pins can be fixed on the ring 4 and the grooves in the jaws 5. In both cases, the disk 9 becomes unnecessary.

Now what I do claim as my invention and desire to secure by Letters Patent is:

A chuck comprising a casing having a slotted top, a bottom, a cylindrical side wall, and a socket projected from the top, clutch members pivoted within the casing and provided with pins parallel to the axis of the casing, a cap fitted to the top of the casing, a disk located between the said clutch members and the top of the casing, said disk being provided with a central shank engaging the socket of the casing, with grooves to receive the pins on the clutch members, and with an additional groove, a pin secured to the cap and projecting therefrom downward through the slot in the top of the casing and into said additional groove of the disk, a flat spring located around the disk and having one end secured to the disk and the other end to the casing, and a collar-ring secured to the socket of the casing immediately above the cap.

In testimony whereof I have hereunto set my hand in the presence of two subscribing witnesses.

PER GOTTHARD BLOMBERG.

Witnesses:
  ALBERT SCHROEDER,
  ANNA SÖDERSTRÖM.